(12) United States Patent
Hirning

(10) Patent No.: US 8,779,759 B2
(45) Date of Patent: Jul. 15, 2014

(54) SENSOR DEVICE FOR DETECTING THE ROTATIONAL POSITION OF A ROTATING SHAFT

(75) Inventor: Walter Hirning, Moegglingen (DE)

(73) Assignee: ZF Lenksysteme GmbH, Schwaebisch Gmuend (DE)

(*) Notice: Subject to any disclaimer, the term of this patent is extended or adjusted under 35 U.S.C. 154(b) by 416 days.

(21) Appl. No.: 13/068,198

(22) Filed: May 5, 2011

(65) Prior Publication Data
US 2011/0260718 A1 Oct. 27, 2011

Related U.S. Application Data

(63) Continuation of application No. PCT/EP2009/063080, filed on Oct. 8, 2009.

(30) Foreign Application Priority Data

Nov. 11, 2008 (DE) .......................... 10 2008 043 639

(51) Int. Cl.
*G01B 7/30* (2006.01)

(52) U.S. Cl.
USPC ....................................... 324/207.25

(58) Field of Classification Search
USPC ........................................ 324/207.25
See application file for complete search history.

(56) References Cited

U.S. PATENT DOCUMENTS

| 2,731,025 | A | * | 1/1956 | Neuman et al. .................. 137/85 |
| 4,984,474 | A | * | 1/1991 | Matsushima et al. ..... 73/862.325 |
| 6,198,372 | B1 | | 3/2001 | Schwarz |
| 6,252,394 | B1 | | 6/2001 | Roze et al. |
| 2002/0175251 | A1 | | 11/2002 | Robinson et al. |
| 2008/0164867 | A1 | | 7/2008 | Steinich et al. |

FOREIGN PATENT DOCUMENTS

| DE | 40 40 287 | 6/1992 |
| DE | 198 57 017 | 6/1999 |
| DE | 10 2005 059 162 | 6/2007 |
| DE | 20 2007 011 837 | 12/2007 |
| EP | 0 986 159 | 3/2000 |

* cited by examiner

*Primary Examiner* — Bot Ledynh
(74) *Attorney, Agent, or Firm* — Jordan and Hamburg LLP

(57) ABSTRACT

A sensor device for detecting the rotational position of a rotating shaft, which is rotatably mounted in a housing, comprises a transducer magnet fastened to a carrier pin, which is accommodated in a recess in the end face of the shaft.

20 Claims, 1 Drawing Sheet

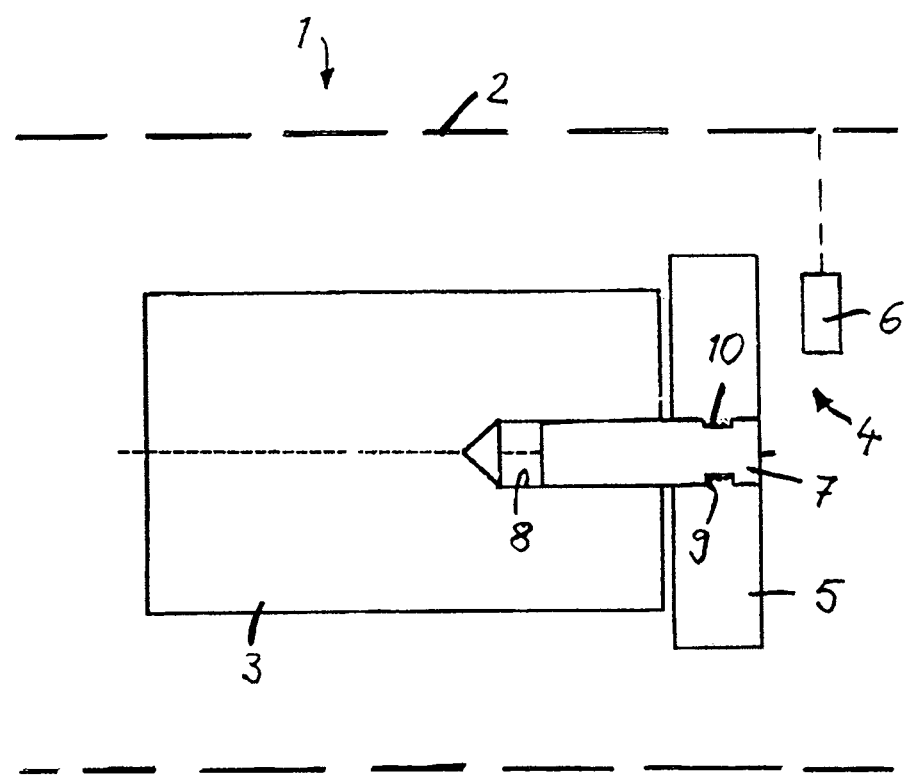

SENSOR DEVICE FOR DETECTING THE ROTATIONAL POSITION OF A ROTATING SHAFT

This is a Continuation Application of PCT/EP2009/063080 Filed Oct. 8, 2009.

BACKGROUND OF THE INVENTION

The invention relates to a sensor device for detecting the rotational position of a rotating shaft.

DE 10 2005 059 162 A1 describes the detection of the rotational position of a rotor shaft in an electric motor using a sensor device. The sensor device comprises a transducer magnet, which is connected to the rotor shaft in a rotationally fixed manner, and a sensor, which detects changes in the magnetic field that originate from the transducer magnet during the rotation of the rotor shaft. The transducer magnet is designed as a magnetic ring molded in a pulley, which is disposed on the end face of the rotor shaft and is connected thereto in a rotationally fixed manner. The sensor is fixed to the housing.

As the carrier of the transducer magnet, the pulley must be rigidly connected to the rotor shaft. For this purpose, a compact and easy-to-mount design must generally be ensured.

SUMMARY OF THE INVENTION

It is the object of the invention, to implement a sensor device for detecting the rotational position of a rotating component in a compact and easy-to-mount manner, wherein at the same time a rigid connection is to be created between a transducer magnet of the sensor device and the shaft, using simple design measures.

The sensor device according to the invention is used, for example, to detect the rotational position of a steering shaft in a steering system of a vehicle. According to a further embodiment, the sensor device is used to detect the rotational position of a rotor shaft in an electric motor, for example in an electric servo motor in a steering system of a vehicle.

The sensor device comprises a transducer magnet and a sensor, wherein according to the invention, the transducer magnet is accommodated on a carrier part designed as a carrier pin and the carrier pin is inserted in a recess in the end face of the shaft. This embodiment is characterized by a simple design, wherein a rigid connection notably exists both between the carrier pin and the transducer magnet and between the carrier pin and the shaft, so that the transducer magnet is connected to the shaft in a rotationally fixed manner by means of the carrier pin and also assumes a fixed position in relation to the shaft in the axial direction. As the carrier part, the carrier pin can be easily connected to the transducer magnet, for example in a manner wherein the transducer magnet has an annular configuration and the carrier pin projects into a central recess in the annular transducer magnet. To this end, it is possible to use both embodiments in which the annular transducer magnet is placed on the carrier pin as a separate, prefabricated component and is connected thereto, and embodiments in which the transducer magnet is produced as an injection-molded component and molded onto the carrier pin in the injection molding process.

It is further possible, instead of an annular shape, to employ other geometries for the transducer magnet, for example a disk shape without central recess, and in this case the transducer magnet must be connected to the carrier pin by means of suitable fastening measures, for example by fastening means such as brackets, screws or by gluing or other measures.

Because the carrier pin is accommodated in the recess in the end face of the shaft, a relatively large contact surface exists between the inside wall of the recess and the outside jacket of the carrier pin, by means of which torque can be transmitted in the circumferential direction and forces can be transmitted in the axial direction. The connection is preferably established by pressing the carrier pin into the recess, and due to the large contact surface, a relatively low oversize in the diameter of the carrier pin in relation to the diameter of the recess suffices to establish a sufficiently rigid connection. Given the relatively high pressing forces, the carrier pin is preferably made of high-strength material in this embodiment.

However, it is also possible, in principle, to introduce defined notches in the inside jacket of the recess and/or the outside jacket of the carrier pin, whereby lower pressing forces suffice, due to the linear contact between the carrier pin and recess and plastic deformation in the region of the contact surface. If the notches are located, by way of example, on the inside jacket of the recess, a carrier pin that is made of softer material, such as brass, having a cylindrical shape, may be used, the outside jacket of which cuts into the notches on the inside jacket of the recess during pressing. In this way, a positive torque fit is achieved. Deformations occurring during the pressing operation in the region of the outside jacket of the carrier pin can fill in cavities between the carrier pin and inside jacket of the recess, and thereby further improve the positive fit. Optionally, it is also possible to use a pin made of harder material, which is pressed into the recesses with notches on the inside jacket.

Other joining measures between the carrier pin and the recess are also possible, for example gluing or mechanical joining means.

The connection between the transducer magnet and the carrier pin is advantageously positive, wherein the positive fit preferably exists at least in the axial direction. The positive fit is formed, for example, by radial depressions, and radial elevations projecting into the depressions, between the transducer magnet and outside jacket of the carrier pin. The depressions are located, for example, on the outside jacket of the carrier pin, and the elevations are accordingly located on the inside of the central recess in the annular transducer magnet. In general, however, a reverse embodiment is also possible, which is to say a radial elevation on the outside jacket of the carrier pin and a corresponding radial depression on the inside of the central recess in the transducer magnet.

To achieve sufficient torque coupling between the annular transducer magnet and carrier pin, the transducer magnet is advantageously connected to the carrier pin by a friction fit. The friction fit is notably formed by roughening the directly adjoining surfaces of contact between the carrier pin and transducer magnet, for example by a knurled surface on the outside jacket of the carrier pin, whereby the friction between the transducer magnet and the carrier pin is significantly increased. In a combination with the positive fit in the axial direction, the knurled surface is preferably located in a radial depression on the lateral surface of the carrier pin.

In the mounted state, the transducer magnet is advantageously located at an axial distance from the end face of the shaft, the rotational position of which is to be detected. The resulting air gap between the transducer magnet and the end face of the shaft has a magnetically insulating function, so that the magnetic field originating from the transducer magnet is not influenced by the shaft, or only to a slight degree. In general, however, it is also possible for the transducer magnet to be seated directly against the end face of the shaft, notably in combination with magnetic insulation, for example by way of a magnetically non-conductive ring located between the end face of the shaft and the transducer magnet.

Further advantages and advantageous embodiments are disclosed in the description of the FIGURE and the drawing.

BRIEF DESCRIPTION OF THE DRAWING

FIG. 1 is a schematic illustration of a sensor assembly on a rotor shaft of an electric motor.

DESCRIPTION OF THE PREFERRED EMBODIMENTS

The electric motor 1 shown is, for example, an electric servo motor for servo assistance in a steering system of a motor vehicle. In a housing 2, the electric motor 1 comprises a stator fixed to the housing and a rotatably mounted rotor shaft 3, the rotational position of which is detected by a sensor device 4. The sensor device 4 comprises a transducer magnet 5, which is connected to the rotor shaft 3 in a rotationally fixed manner, and a sensor 6, which is fixed to the housing and is able to detect the changes in the magnetic field that occur during rotation of the rotor shaft 3 and the transducer magnet 5. The corresponding sensor signals of the sensor 6 are evaluated in a regulation or control unit and may be used to adjust the electric motor 1.

The sensor 6 is an AMR (anisotropic magnetoresistance) sensor, for example, or a Hall sensor.

The transducer magnet is fastened to a carrier pin 7, which is inserted in a recess 8 introduced in the end face of the shaft 3. To achieve a positive engagement between the transducer magnet 5 and the carrier pin 7 in the axial direction, an annular depression 9 is introduced in the lateral surface of the carrier pin 7, this depression being provided with a knurl 10. The knurl 10 is provided to establish a friction fit, in the circumferential or rotational direction, between the transducer magnet 5 and the carrier pin 7. The transducer magnet 5 is located in the depression 9 against the carrier pin 7 with contact with the knurl 10.

The transducer magnet 5 is advantageously an injection-molded component, which is molded onto the carrier pin 7 in the injection molding process.

To establish a rigid connection between the carrier pin 7 and shaft 3, both in the axial direction and in the rotational direction, the carrier pin 7 is pressed into the recess 8. According to a first advantageous embodiment, the carrier pin 7 is composed of a strong material, which is able to absorb relatively high axial pressing forces. According to a second advantageous embodiment, the inside jacket of the recess 8 comprises notches, which are introduced, for example, by means of a notched stamping tool, which has the advantage that a carrier pin made of softer material, for example brass, can be used, the lateral surface of which deforms slightly when pressed into the recess 8, so that a positive fit is created between the notches and the lateral surface of the carrier ring, this positive fit being effective in particular in the rotational direction, but also in the axial direction, whereby the carrier pin 7 is securely connected to the shaft 3.

In the embodiment shown, in the mounted position, the transducer magnet 5 is located at a distance from the end face of the shaft 3, so that an air gap is present between the end face of the shaft 3 and the axial end face of the transducer magnet facing the same, this air gap having a magnetically insulating function.

LIST OF REFERENCE NUMERALS

1 Electric motor
2 Housing
3 Rotor shaft
4 Sensor device
5 Transducer magnet
6 Sensor
7 Carrier pin
8 Recess
9 Depression
10 Knurl

The invention claimed is:

1. A sensor device for detecting the rotational position of a rotating shaft which is rotatably mounted in a housing, comprising:
 an injection-molded transducer magnet which is fastened to a carrier part connected to the shaft;
 wherein the carrier part is a carrier pin, a portion of which is accommodated in an axial central recess in an end face of the shaft;
 wherein the transducer magnet has an annular design comprising an axial central recess which accommodates a portion of the carrier pin with a positive fit; and
 wherein the positive fit comprises radial depressions and radial elevations projecting into the depressions between the transducer magnet and an outside jacket of the carrier pin.

2. The sensor device according to claim 1, wherein the transducer magnet surrounds the carrier pin.

3. The sensor device according to claim 1, wherein the transducer magnet is designed as an injection-molded component and is molded onto the carrier pin.

4. A sensor device according to claim 1, wherein the transducer magnet is disposed at an axial distance from the end face of the shaft.

5. A sensor device according to claim 1, wherein the transducer magnet is positively seated on the carrier pin.

6. A sensor device for detecting the rotational position of a rotating shaft which is rotatably mounted in a housing, comprising:
 an injection-molded transducer magnet which is fastened to a carrier part connected to the shaft;
 wherein the carrier part is a carrier pin, a portion of which is accommodated in an axial central recess in an end face of the shaft;
 wherein the transducer magnet has an annular design comprising an axial central recess which accommodates a portion of the carrier pin;
 wherein the transducer magnet is positively seated on the carrier pin; and
 wherein the positive fit comprises radial depressions and radial elevations projecting into the depressions between the transducer magnet and an outside jacket of the carrier pin.

7. A sensor device according to claim 1, wherein the transducer magnet is connected to the carrier pin by a friction fit.

8. The sensor device according to claim 7, wherein the friction fit is formed by roughening the directly adjoining contact surfaces between the carrier pin and transducer magnet.

9. A sensor device according to claim 1, wherein the carrier pin extends into the recess in the end face of the shaft.

10. A sensor device according to claim 1, wherein at least one contact surface between the recess and the carrier pin is provided with a notch.

11. A steering system comprising a sensor device according to claim 1, wherein the shaft comprising the transducer magnet is a steering shaft of the steering system.

12. An electric motor comprising a sensor device according to claim 1, wherein the shaft comprising the transducer magnet is the rotor shaft of the electric motor.

13. The sensor device according to claim 2, wherein the transducer magnet is designed as an injection-molded component and is molded onto the carrier pin.

14. A sensor device according to claim 2, wherein the transducer magnet is disposed at an axial distance from the end face of the shaft.

15. A sensor device according to claim 3, wherein the transducer magnet is disposed at an axial distance from the end face of the shaft.

16. A sensor device according to claim 2, wherein the transducer magnet is positively seated on the carrier pin.

17. A sensor device according to claim 3, wherein the transducer magnet is positively seated on the carrier pin.

18. A sensor device according to claim 4, wherein the transducer magnet is positively seated on the carrier pin.

19. A sensor device according to claim 2, wherein the transducer magnet is connected to the carrier pin by a friction fit.

20. A sensor device according to claim 1, wherein the carrier pin extends into the recess in the end face of the shaft.

\* \* \* \* \*